(12) United States Patent
Birch et al.

(10) Patent No.: US 9,447,900 B2
(45) Date of Patent: Sep. 20, 2016

(54) NON-CONDUCTIVE ROLLER ASSEMBLY

(71) Applicant: Mueller International, LLC, Atlanta, GA (US)

(72) Inventors: Frank J. Birch, Pawtucket, RI (US); Carlos V. Costa, Somerset, MA (US); Gary P. Szechy, Norh Royalton, OH (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 13/895,945

(22) Filed: May 16, 2013

(65) Prior Publication Data

US 2014/0339375 A1 Nov. 20, 2014

(51) Int. Cl.
*F16C 21/00* (2006.01)
*F16L 3/18* (2006.01)
*F16C 13/04* (2006.01)

(52) U.S. Cl.
CPC . *F16L 3/18* (2013.01); *F16C 13/04* (2013.01)

(58) Field of Classification Search
USPC .......... 248/49, 55, 65; 384/91, 58, 129, 548, 384/514, 569, 618, 619, 416, 417, 418, 125, 384/127, 128, 215, 220, 221
See application file for complete search history.

(56) References Cited

U.S. PATENT DOCUMENTS

| | | | | |
|---|---|---|---|---|
| 1,338,437 A | * | 4/1920 | Greene | 248/158 |
| 1,476,473 A | * | 12/1923 | Skinner | 248/55 |
| 1,541,129 A | * | 6/1925 | Farley | 248/55 |
| 2,103,811 A | * | 12/1937 | Davis | 248/55 |
| 2,705,119 A | * | 3/1955 | Ingwer | 248/55 |
| 3,003,726 A | * | 10/1961 | Duhamel | 248/55 |
| 3,407,011 A | * | 10/1968 | Zeidler | 384/54 |
| 3,769,190 A | * | 10/1973 | Deem, Jr. | 4/196.15 |
| 3,863,877 A | * | 2/1975 | Gregory | 248/295.11 |
| 4,071,958 A | * | 2/1978 | Morita | G01B 5/213 209/517 |
| 4,101,118 A | * | 7/1978 | Mottola et al. | 267/136 |
| 4,349,184 A | * | 9/1982 | Peterson et al. | 267/153 |
| 4,671,678 A | * | 6/1987 | Munch | 384/125 |
| 4,789,120 A | * | 12/1988 | Spidel | 248/49 |
| 4,826,128 A | * | 5/1989 | Schmeller | 248/669 |
| 4,907,814 A | * | 3/1990 | Foster | 280/104 |
| 5,028,149 A | * | 7/1991 | Hardtke | 384/46 |
| 5,337,875 A | * | 8/1994 | Lee | 193/35 R |
| 5,597,266 A | * | 1/1997 | Cielker | 405/184.4 |
| 5,779,198 A | * | 7/1998 | Rutherford et al. | 248/58 |
| 5,829,718 A | * | 11/1998 | Smith | 248/55 |
| 5,983,742 A | * | 11/1999 | Morris et al. | 74/422 |
| 6,042,061 A | * | 3/2000 | Shimizu | 248/55 |

(Continued)

OTHER PUBLICATIONS

Linn Brown and Associates, Inc (LB&A); article entitled: "Non-Conductive Pipe Rollers" located at <www.ncroll.com/ncroll.htm>, accessed on Sep. 16, 2013, copyright notice lists 2012, 3 pgs.
Allied Corrosion Industries, Inc.; article entitled: "Non-Conductive Pipe Rollers", located at: <www.alliedcorrosion.com/products/insulator_non_conductive_pipe_roller_lba.php>, accessed on Sep. 16, 2013, 2 pgs.

(Continued)

*Primary Examiner* — Terrell McKinnon
*Assistant Examiner* — Michael McDuffie
(74) *Attorney, Agent, or Firm* — Taylor English Duma LLP

(57) ABSTRACT

A pipe roller assembly includes a roller base; a roller shaft mounted to the roller base, the roller shaft defining an outer shaft surface; a roller defining an outer roller surface and an inner bearing surface, the roller mounted on the roller shaft; and an non-conductive barrier mounted between the roller and the roller base, the non-conductive barrier electrically isolating the roller from the roller base.

20 Claims, 10 Drawing Sheets

(56) References Cited

U.S. PATENT DOCUMENTS

| | | | |
|---|---|---|---|
| 6,364,256 B1* | 4/2002 | Neider et al. | 248/55 |
| 6,520,456 B1* | 2/2003 | Neider et al. | 248/49 |
| 6,592,093 B2* | 7/2003 | Valentz | 248/346.01 |
| 7,475,513 B2* | 1/2009 | Parker | 52/27 |
| 7,900,873 B2* | 3/2011 | Kulesha et al. | 244/135 R |
| 8,448,964 B2* | 5/2013 | Bramer et al. | 280/124.116 |
| 2001/0009087 A1* | 7/2001 | Valentz et al. | 52/298 |
| 2004/0113025 A1* | 6/2004 | Sargent | 248/49 |
| 2008/0101742 A1* | 5/2008 | Kawaguchi et al. | 384/450 |
| 2009/0008513 A1* | 1/2009 | Preston et al. | 248/55 |
| 2010/0242785 A1* | 9/2010 | Turner | B60S 3/004 104/172.3 |
| 2011/0272257 A1* | 11/2011 | Nikishichev | B65G 39/09 198/842 |
| 2012/0012016 A1* | 1/2012 | Moeller | B26D 7/2628 101/26 |

OTHER PUBLICATIONS

Utility Product Company; article entitled "Non-Conductive Pipe Rollers", located at <www.utility-products.com/components/pep_rollers/non-conductive_rollers/>, accessed on Sep. 16, 2013, copyright notice lists 2011, 3 pgs.

Allied Corrosion Industries, Inc; article entitled: "Type #180 Saddles from Glas Mesh", located at <www.alliedcorrosion.com/products/insulator_frp_180_saddle_glasmesh.php>, accessed on Sep. 16, 2013, 1 pg.

Allied Corrosion Industries, Inc; article entitled: "Type #240 Roll-on Shields from Glas Mesh", located at <www.alliedcorrosion.com/products/insulator_frp_240_shield_glasmesh.php>, accessed on Sep. 16, 2013, 1 pg.

* cited by examiner

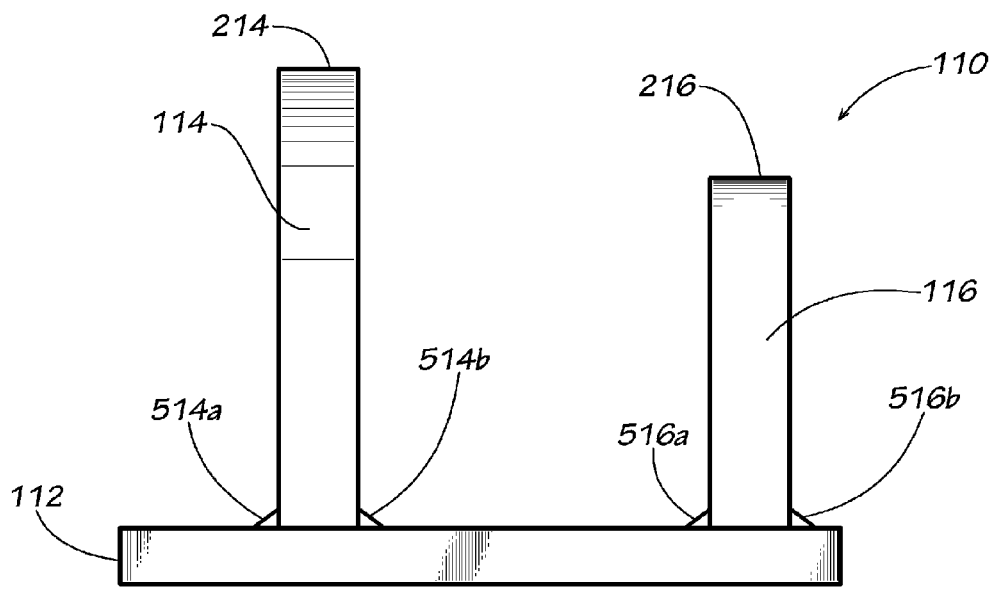
FIG. 5A
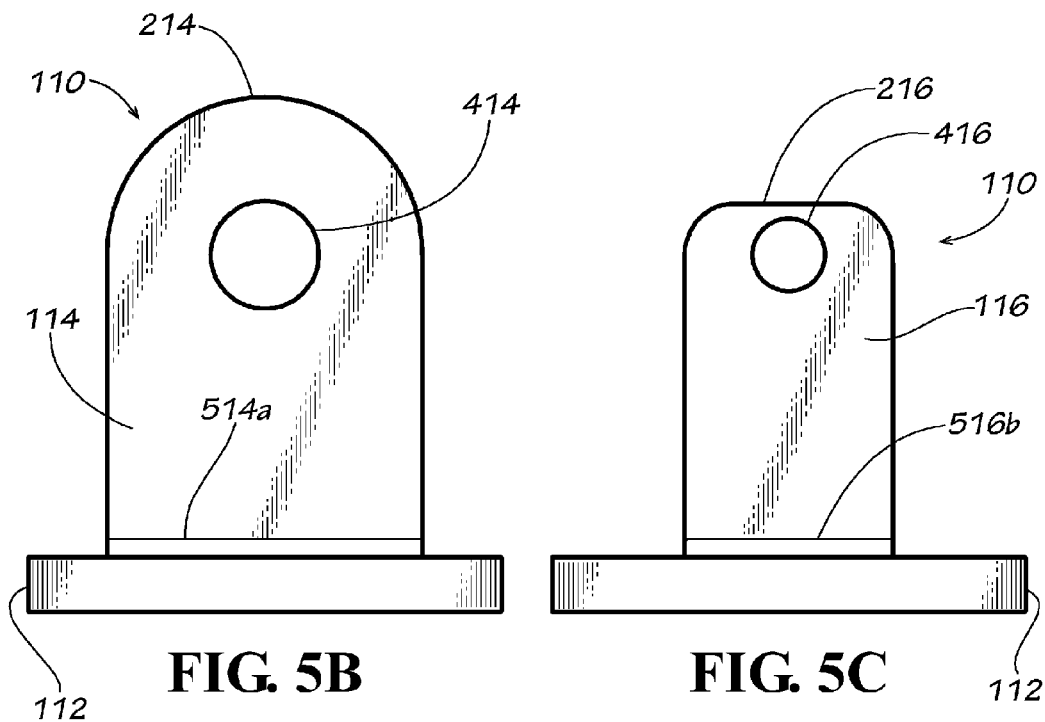
FIG. 5B   FIG. 5C

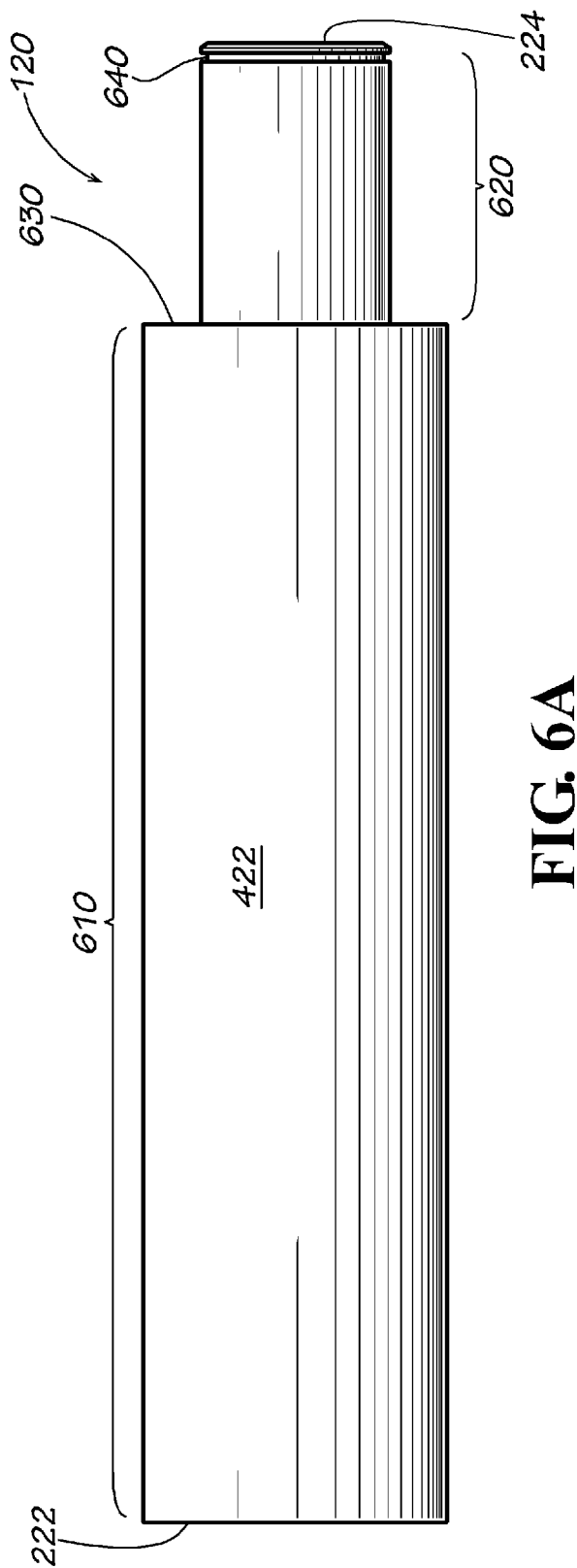
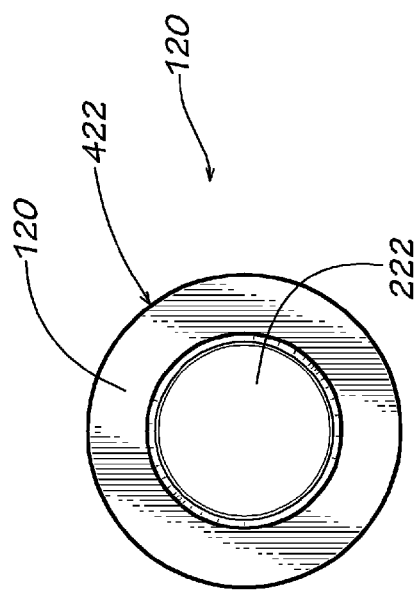
FIG. 6A
FIG. 6B

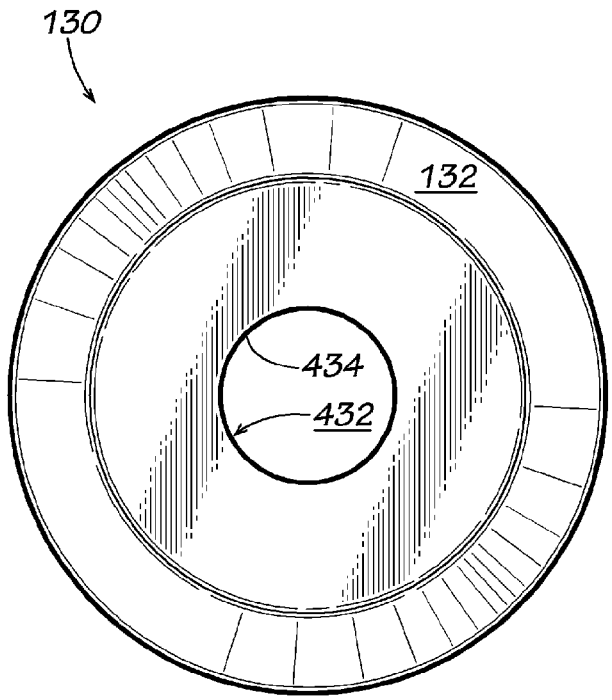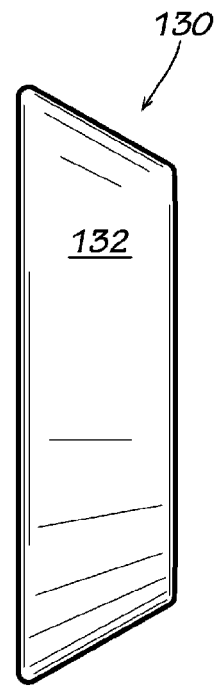
FIG. 7A  FIG. 7B
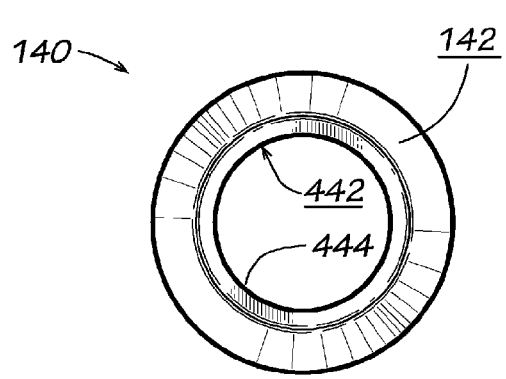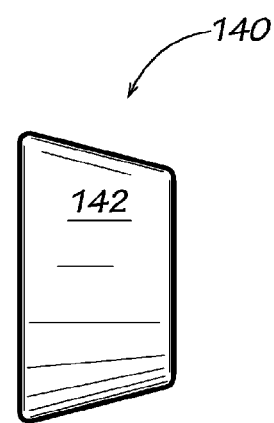
FIG. 8A  FIG. 8B

NON-CONDUCTIVE ROLLER ASSEMBLY

TECHNICAL FIELD

This disclosure relates to piping. More specifically, this disclosure relates to pipe rollers.

BACKGROUND

Pipelines may be mounted aboveground, belowground, or a combination of the two. One way of mounting pipelines aboveground is through the use of a pipe roller assembly. A pipe roller assembly may be mounted to a pipeline and a mounting surface and holds the pipeline in position. The pipe roller assembly allows for some movement of the pipeline along the axis of the pipeline due to, for example, expansion and contraction of the pipeline or seismic events.

SUMMARY

Disclosed is a pipe roller assembly including a roller base; a roller shaft mounted to the roller base, the roller shaft defining an outer shaft surface; a roller defining an outer roller surface and an inner bearing surface, the roller mounted on the roller shaft; and an non-conductive barrier mounted between the roller and the roller base, the non-conductive barrier electrically isolating the roller from the roller base.

Also disclosed is a pipe roller assembly including a roller base; a roller shaft mounted to the roller base, the roller shaft defining an outer shaft surface; a roller defining an outer roller surface and an inner bearing surface, the roller mounted on the roller shaft; and a non-conductive bearing mounted on the roller shaft, the bearing electrically isolating the roller from the roller base.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIGS. 5A, 5B, and 5C are various side views of a base assembly of a pipe roller assembly, according to embodiments of the current disclosure.

FIGS. 6A and 6B are various side views of a roller shaft of a pipe roller assembly, according to embodiments of the current disclosure.

FIG. 7A and 7B are various side views of a large roller of a pipe roller assembly, according to embodiments of the current disclosure.

FIG. 8A and 8B are various side views of a small roller of a pipe roller assembly, according to embodiments of the current disclosure.

DETAILED DESCRIPTION

Disclosed is a pipe roller assembly and associated methods, systems, devices, and various apparatus. The pipe roller assembly includes at least one roller, a roller shaft, a roller base, and a non-conductive barrier. It would be understood by one of skill in the art that the disclosed pipe roller assembly is described in but a few exemplary embodiments among many. No particular terminology or description should be considered limiting on the disclosure or the scope of any claims issuing therefrom.

Figure 1:
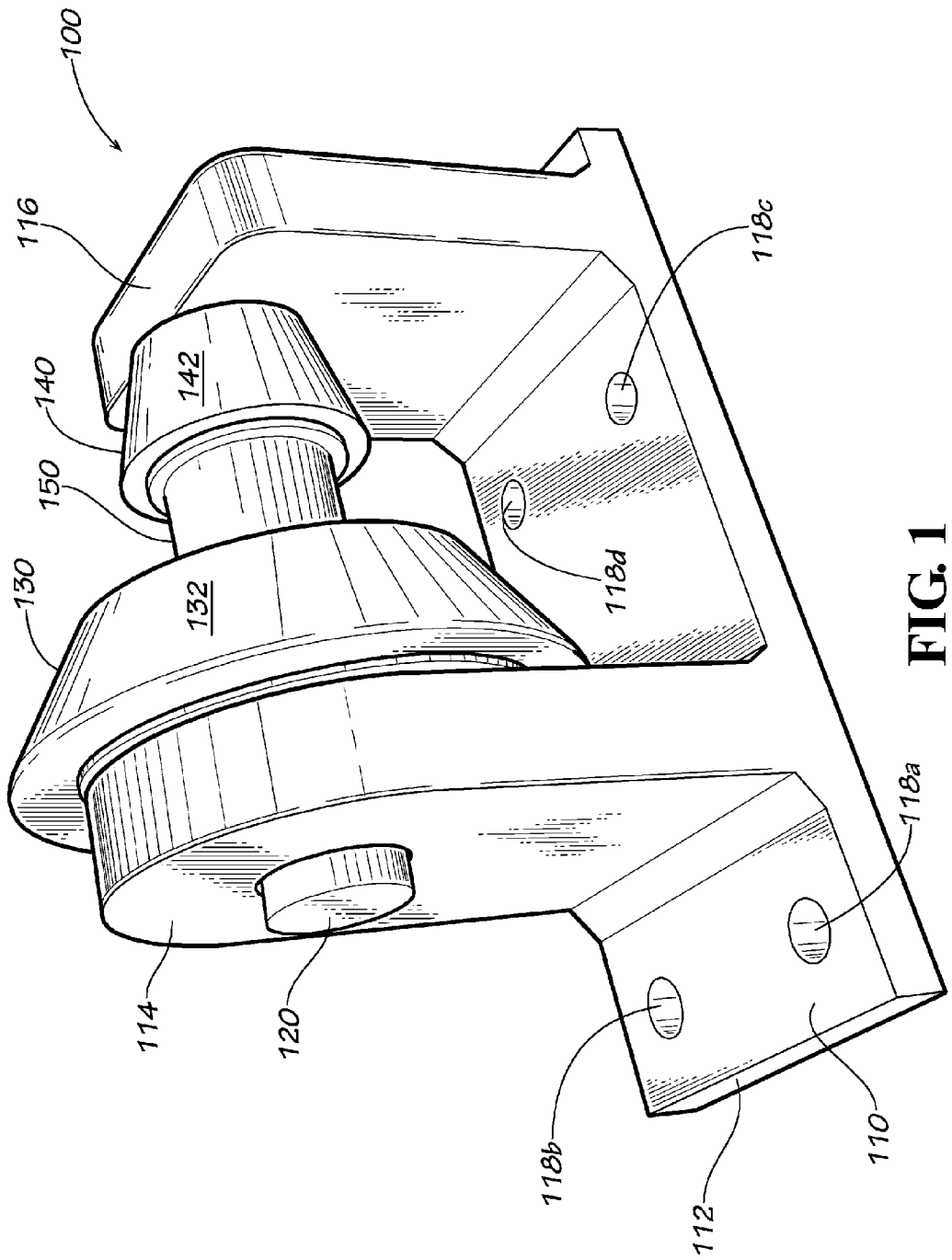
FIG. 1 is a perspective view of a pipe roller assembly in accord with some embodiments of the current disclosure.

One embodiment of a pipe roller assembly 100 is disclosed and described in FIG. 1. The pipe roller assembly 100 includes a roller base 110, a roller shaft 120, a first roller 130, a second roller 140, and a spacer bearing 150. As seen in FIG. 1, the roller base 110 includes a base plate 112, a first lug 114, and a second lug 116. The first lug 114 and the second lug 116 extend from the base plate 112. The base plate 112 may also define a number of fastener holes, such as fastener holes 118a,b,c,d therethrough, though any number of fastener holes 118 may be present in various embodiment. The roller shaft 120 is mounted through and between the first lug 114 and the second lug 116. The first roller 130, the second roller 140, and the spacer bearing 150 are mounted adjacent to each other on the roller shaft between the first lug 114 and the second lug 116.

The first roller 130 defines an outer roller surface 132 and the second roller 140 defines an outer roller surface 142. The first roller 130 and the second roller 140 are annular and are mounted on the roller shaft 120 such that the center axis of the first roller 130 and the second roller 140 are coaxial with the center axis of the roller shaft 120. The first roller 130 may be larger than the second roller 140, according to some embodiments, such that the average diameter of the outer roller surface 132 of the first roller 130 is larger than the outer roller surface 142 of the second roller 140. The spacer bearing 150 spaces the first roller 130 and the second roller 140 apart from one another to prevent contact and relative movement between the first roller 130 and the second roller 140 along the roller shaft 120.

Figure 2:
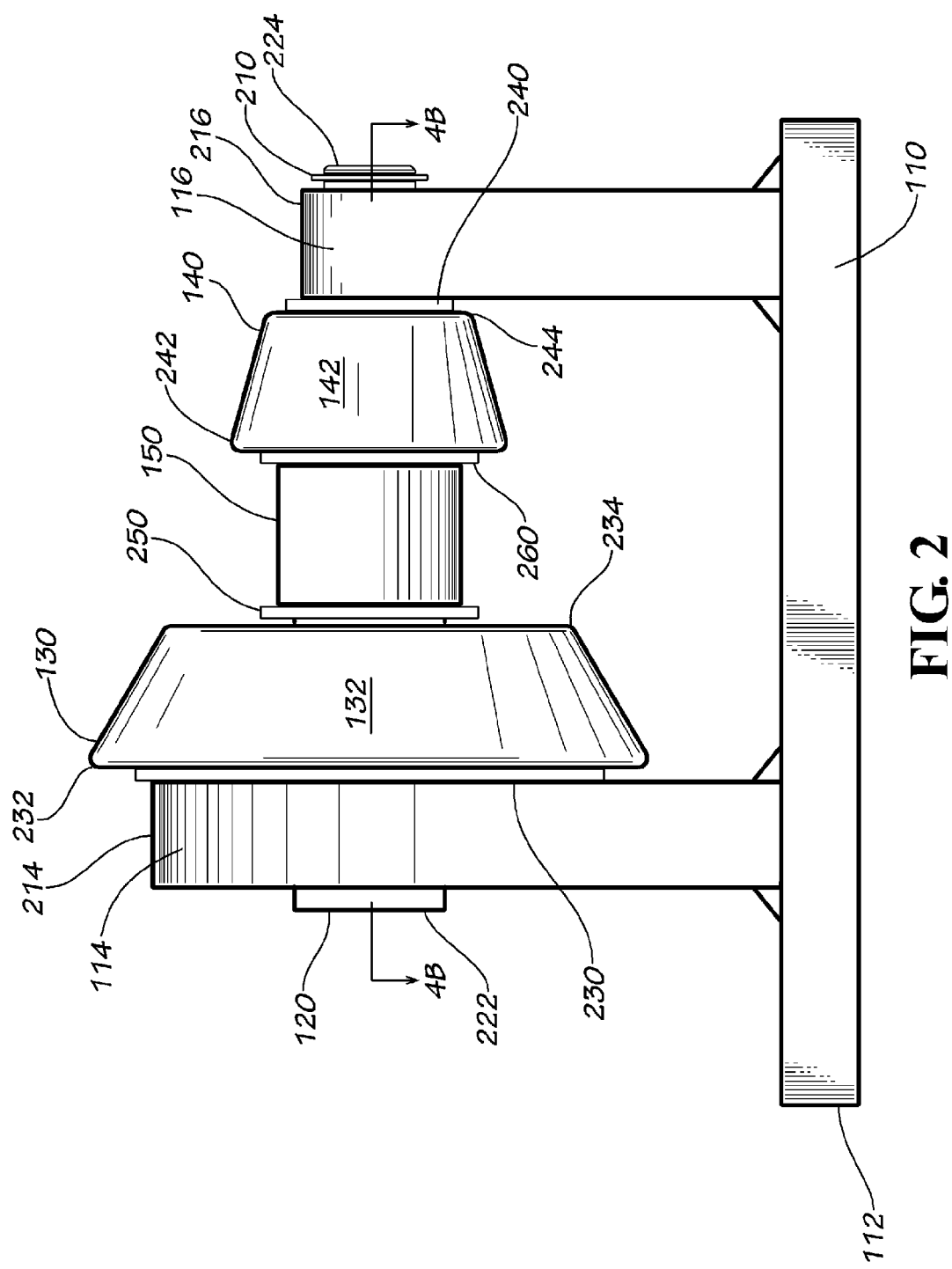
FIG. 2 is a side view of the pipe roller assembly of FIG. 1.
Figure 3:
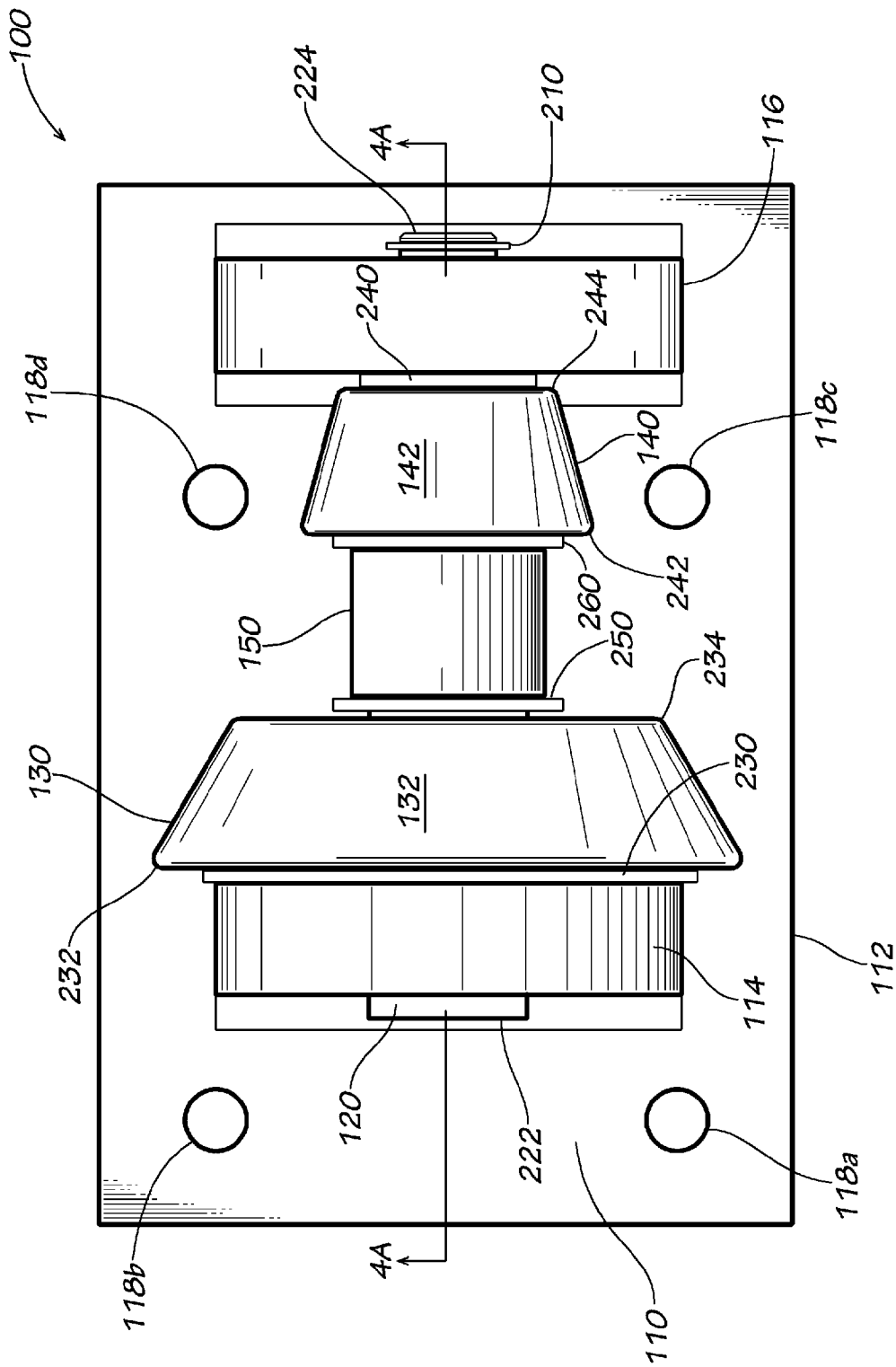
FIG. 3 is a top view of the pipe roller assembly of FIG. 1.

FIG. 2 shows a side view of the pipe roller assembly 100, and FIG. 3 shows a top view of the pipe roller assembly 100. As shown in FIGS. 2 and 3, the roller shaft 120 extends through the first lug 114, the first roller 130, the spacer bearing 150, the second roller 140, and the second lug 116. The roller shaft has a first end 222 and a second end 224. In the current embodiment, the diameter of the first end 222 is greater than the diameter of the second end 224. A retaining ring 210 is mounted on the roller shaft 120 proximate the second end 224. The retaining ring 210 prevents the roller shaft 120 from being pulled through the second lug 116, holding the roller shaft 120 in place in the piper roller assembly 100 while still allowing the roller shaft 120 to rotate.

Also shown mounted on the roller shaft 120 are a first roller washer 230, a second roller washer 240, a first spacer washer 250, and a second spacer washer 260. The first roller washer 230 is mounted on the roller shaft 120 between the first roller 130 and the first lug 114, and the second roller washer 240 is mounted on the roller shaft 120 between the second roller 140 and the second lug 116. The first spacer washer 250 is mounted on the roller shaft 120 between the first roller 130 and the spacer bearing 150, and the second spacer washer 260 is mounted on the roller shaft 120 between the second roller 140 and the spacer bearing 150.

As seen in FIG. 2, the first lug 114 may extend further from the base plate 112 than the second lug 116, according to some embodiments. The first lug 114 includes an upper end 214 and the second lug 116 includes an upper end 216. The upper ends 214,216 are each distal from the base plate 112. The upper end 214 of the first lug 114 is closer to the roller shaft 120 than an outer edge 232 of the outer roller surface 132 of the first roller 130, and the upper end 216 of the second lug 116 is closer to the roller shaft 120 than an inner edge 244 of the outer roller surface 142 of the second roller 140. The outer roller surface 132 of the first roller 130 also includes an inner edge 234, and the outer rollers surface 142 of the second roller 140 also includes an outer edge 242. The outer edge 232 has a radius greater than the inner edge 234, and the outer edge 242 has a radius greater than the inner edge 244. In addition, the inner edge 234 of the first roller 130 has a radius greater than the outer edge 242 of the second roller 140.

Figure 4A:
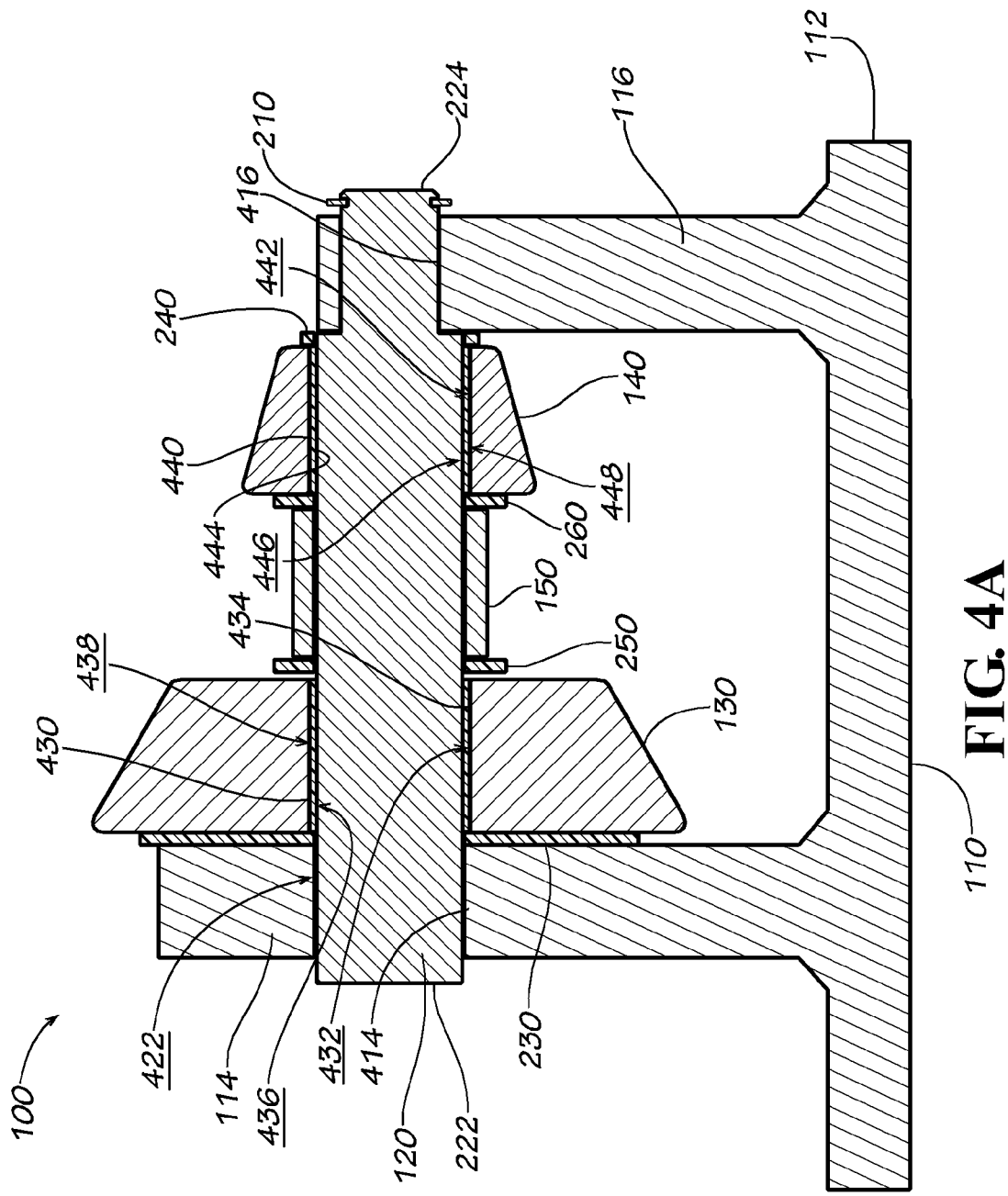
FIG. 4A is a side cross-sectional view of the pipe roller assembly of FIG. 3 taken along line 4A-4A.
Figure 4B:
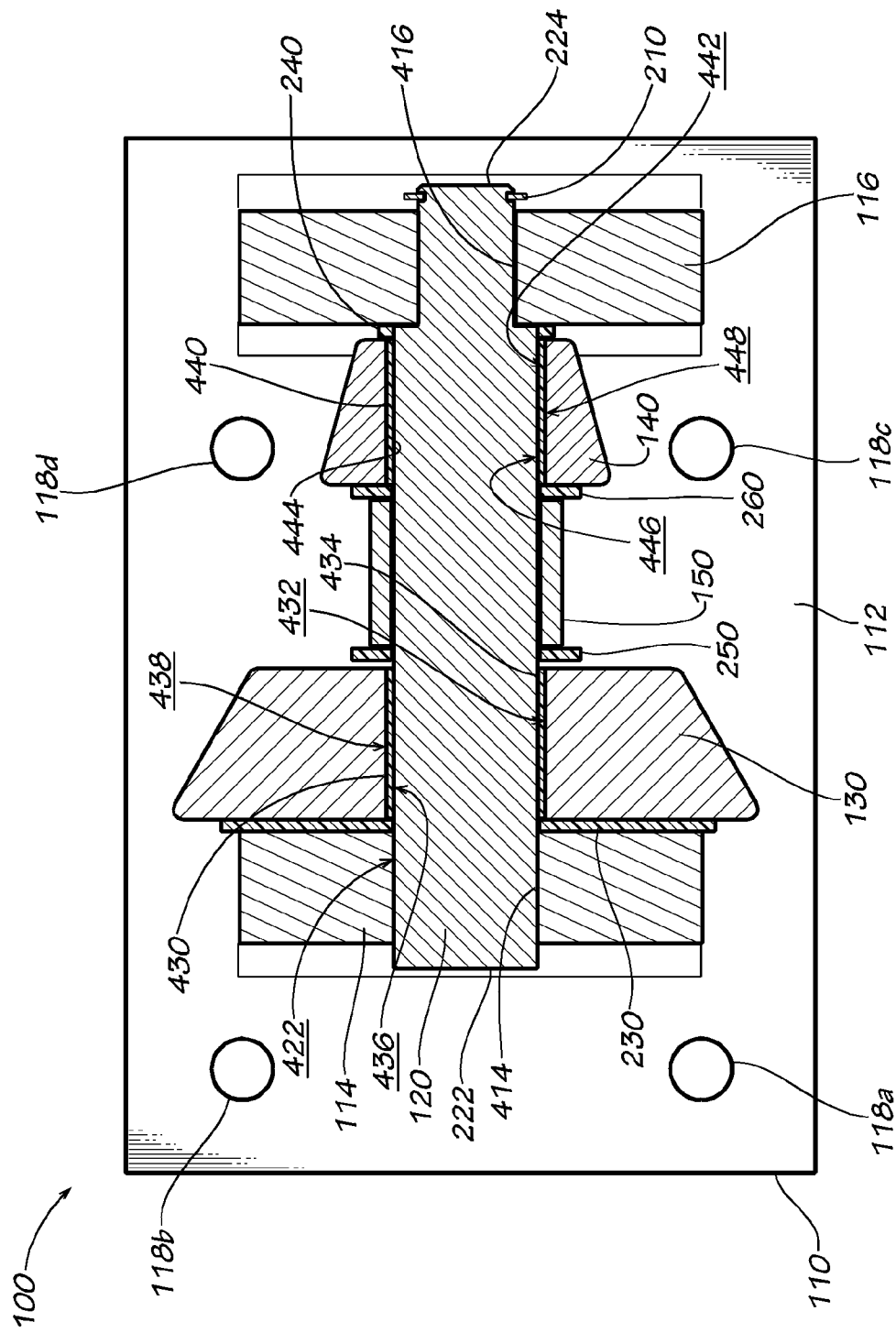
FIG. 4B is a top cross-sectional view of the pipe roller assembly of FIG. 2 taken along line 4B-4B.

FIG. 4A shows a side cross-sectional view of pipe roller assembly 100 taken along line 4A-4A in FIG. 3, and FIG. 4B shows a top cross-sectional view of pipe roller assembly 100 taken along line 4B-4B in FIG. 2. As seen in FIGS. 4A and 4B, a first lug bore 414 is defined through first lug 114 and a second lug bore 416 is defined through the second lug 116. Further, a first roller bore 434 is defined through the first roller 130 and a second roller bore 444 is defined through the second roller 140. The first roller bore 434 defines an inner bearing surface 432 and the second roller bore 444 defines an inner bearing surface 442. The roller shaft 120 can be seen in FIGS. 4A and 4B extending through first lug bore 414, first roller washer 230, first roller bore 434, first spacer washer 250, spacer bearing 150, second spacer washer 260, second roller bore 444, second roller washer 240, and second lug bore 416. Further, as can be seen in FIGS. 4A and 4B, the roller shaft 120 defines an outer shaft surface 422.

In some embodiments, a bearing may be located between the roller shaft 120 and the first roller 130 in the form of a first bushing 430. Similarly, a bearing may be located between the roller shaft 120 and the second roller 140 in the form of a second bushing 440. The first bushing 430 defines an inner bushing surface 436 and an outer bushing surface 438, and the second bushing 440 defines an inner bushing surface 446 and an outer bushing surface 448. The first bushing 430 is press-fit into the inner bearing surface 432 of the first roller 130, with the outer bushing surface 438 contacting the inner bearing surface 432. The second bushing 440 is press-fit into the inner bearing surface 442 of the second roller 140, with the outer bushing surface 448 contacting the inner bearing surface 442. The inner bushing surface 436 of the first roller 130 and the inner bushing surface 446 of the second roller 140 both contact the outer shaft surface 422 and allow for rotation of the first bushing 430 and the second bushing 440, and therefore the first roller 130 and the second roller 140, on the roller shaft 120. The first bushing 430 and the second bushing 440 each include an inner sliding layer and an outer backing layer. The inner sliding layer of the first bushing 430 defines the inner bushing surface 436, and the outer backing layer of the first bushing 430 defines the outer bushing surface 438. The inner sliding layer of the second bushing 440 defines the inner bushing surface 446, and the outer backing layer of the second bushing 440 defines the outer bushing surface 448.

According to various embodiments, the combination of the first bushing 430, the second bushing 440, the first roller washer 230, the second roller washer 240, the first spacer washer 250, and the second spacer washer 260 form a non-conductive barrier that prevents electric current from being conducted from either the first roller 130 or the second roller 140 to the roller shaft 120 and the roller base 110, electrically isolating the first roller 130 and the second roller 140 from the roller base 110. In some pipelines, such as oil field pipelines, which may have both aboveground and belowground portions, current is applied from an external power source to the pipeline to prevent corrosion of the metal surface of the pipeline through a process called "cathodic protection," wherein the pipeline is made into a cathode of an electrochemical cell. In various embodiments, 10-50 amps of current and 50 volts of direct current may be run through a pipeline. When a pipe roller assembly is formed from conductive materials, current can flow from the pipeline through the rollers to roller shaft and the roller base of a pipe roller assembly that does not include non-conductive materials, creating a safety hazard. When the non-conductive barrier of the pipe roller assembly 100 described herein is utilized, current is prevented from being conducted from the pipeline to the roller base 110.

The first roller 130, second roller 140, roller shaft 120, and roller base 110 may be formed from various conductive materials in various embodiments. In the current embodiment, the first roller 130, second roller 140, and roller base 110 are formed from A-36 grade steel and the roller shaft 120 is formed from A-479 grade stainless steel, though various grades of steel or other metals or materials may be used in various embodiments.

Each of the first bushing 430, the second bushing 440, the first roller washer 230, the second roller washer 240, the first spacer washer 250, and the second spacer washer 260 may be formed from various non-conductive materials in various embodiments. In the current embodiment, the first roller washer 230, the second roller washer 240, the first spacer washer 250, and the second spacer washer 260 are formed from polyvinyl chloride ("PVC"), though other dielectric materials may be used in various embodiments. Further, in the current embodiment, the inner sliding layers of the first bushing 430 and the second bushing 440 are continuous-wound polytetrafluoroethylene ("PTFE") and high strength fibers encapsulated in an internally-lubricated, high-temperature filled epoxy resin with Teflon-type fillers for lubricity against the roller shaft 120. The outer backing layers of the first bushing 430 and the second bushing 440 are a continuous-wound fiberglass encapsulated in a high-temperature epoxy resin, though other materials may be used in various embodiments. The outer backing layer is formed of a rigid, high-compressive-strength material in the current embodiment so that first bushing 430 and second bushing 440 can bear the weight of the pipelines, including any medium within the pipelines.

In the current embodiment, the first roller washer 230 prevents contact and conduction between the first roller 130 and the first lug 114. The first spacer washer 250 prevents contact and conduction between the first roller 130 and the spacer bearing 150 that may or may not be formed of conductive materials in various embodiments. The first bushing 430 prevents contact and conduction between the first roller 130 and the roller shaft 120. The second roller washer 240 prevents contact and conduction between the second roller 140 and the second lug 116. The second spacer washer 260 prevents contact and conduction between the second roller 140 and the spacer bearing 150. The second bushing 440 prevents contact and conduction between the second roller 140 and the roller shaft 120.

However, in various embodiments, various combinations and locations of spacers and bearings may be used to form a non-conductive barrier between the roller base 110 and the first roller 130 and second roller 140. For example, in various embodiments, a pair of non-conductive bearings, such as first bushing 430 and second bushing 440, may be mounted on the roller shaft 120 between the roller shaft 120 and the first lug 114 and between the roller shaft 120 and the second lug 116, respectively, and a pair of non-conductive washers may be placed on the roller shaft 120 between the first roller 130 and the first lug 114 and between the second roller 140 and the second lug 116, respectively, with no other washers included. For another example, in various embodiments, the first spacer washer 250 and the second spacer washer 260 may be removed from pipe roller assembly 100 and the spacer bearing 150 may be formed from a non-conductive material, becoming an additional component of the non-conductive barrier. In addition, various embodiments of pipe roller assemblies may include only a single roller or any number of rollers, and the roller shaft may be mounted on the roller base by any number of lugs or by other methods known in the art.

FIGS. 5A, 5B, and 5C show a front side view, left side view, and right side view, respectively, of the roller base 110. As seen in FIG. 5A, the first lug 114 includes a pair of lug feet 514a,b and the second lug 116 includes a pair of lug feet 516a,b. The lug feet 514a,b,516a,b serve to support and stabilize the first lug 114 and the second lug 116 in position relative to the base plate 112. The first lug 114 and the second lug 116 are welded to the base plate 112, though the first lug 114 and the second lug 116 may be connected to the base plate 112 by other methods in various embodiments, such as being formed integrally with the base plate 112, gluing, or fastening, among others, and the disclosure of welding should not be considered limiting.

As can be seen in FIG. 5B, the upper end 214 of the first lug 114 may be rounded and, as can be seen in FIG. 5C, the upper end 216 of the second lug 116 may be flat, though other shapes may be used in various embodiments. In the current embodiment, the flat upper end 216 of the second lug 116 provides clearance for a pipeline as shown and described below with respect to FIG. 12. Further, as can be seen in FIGS. 5B and 5C, the first lug bore 414 may have a larger diameter than the second lug bore 416, in some embodiments. The diameter of first lug bore 414 is sized to accept the first end 222 of roller shaft 120, and the diameter of second lug bore 416 is sized to accept the second end 224 of roller shaft 120. The diameter of second lug bore 416 also allows for upper end 216 of the second lug 116 to be closer to the base plate 112 in the current embodiment to provide additional clearance for a pipeline.

FIGS. 6A and 6B show a front side view and right side view, respectively, of a roller shaft 120, according to some embodiments. As seen in FIG. 6A, the roller shaft 120 includes a large-diameter section 610 and a small-diameter section 620. The roller shaft 120 includes a shoulder 630 between the large-diameter section 610 and the small-diameter section 620. The roller shaft 120 also includes a mating groove 640 that is sized to accept the retaining ring 210. The distance between the shoulder 630 and the mating groove 640 is sized so that the second lug 116 may be held between the shoulder 630 and the mating groove 640 when the second end 224 of the roller shaft 120 is inserted into the second lug bore 416 of the second lug 116 and the retaining ring 210 is mated with the mating groove 640.

FIGS. 7A and 7B show a front side view and left side view, respectively, of a first roller 130, and FIGS. 8A and 8B show a front side view and left side view, respectively, of a second roller 140, according to further embodiments. As seen in FIGS. 7A, 7B, 8A, and 8B, the first roller bore 434 and the second roller bore 444 extend through the first roller 130 and the second roller 140, respectively.

Figure 9:
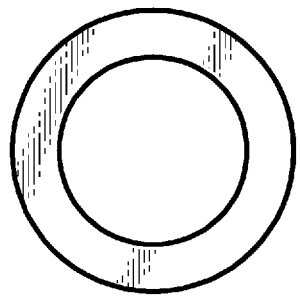
FIG. 9 is a side view of a small washer of the pipe roller assembly of FIG. 1.
Figure 10:
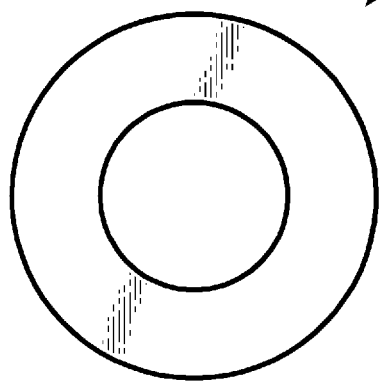
FIG. 10 is a side view of a medium washer of the pipe roller assembly of FIG. 1.
Figure 11:
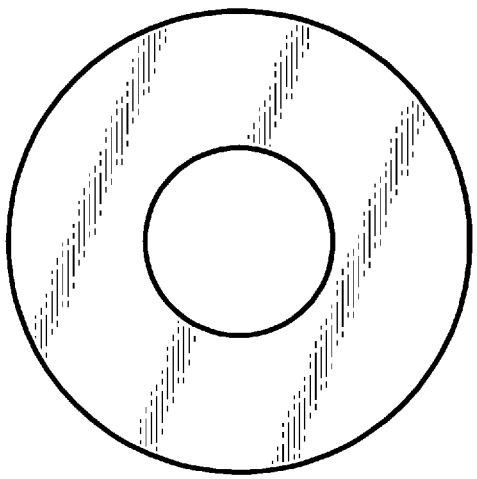
FIG. 11 is a side view of a large washer of the pipe roller assembly of FIG. 1.

FIGS. 9, 10, and 11 show side views of a second roller washer 240, first spacer washer 250, and the first roller washer 230, respectively, according to some embodiments. In the some embodiments, the first spacer washer 250 and the second spacer washer 260 are the same size and dimensions. Further, as can be seen in FIGS. 9, 10, and 11, the second roller washer 240, first spacer washer 250, and the first roller washer 230 each have bores defined therethrough, having a diameter approximately equal to the diameter of the outer surface 422 of the roller shaft 120. The first spacer washer 250 has an outside diameter less than the outside diameter of the first roller washer 230 and greater than the outside diameter of the second roller washer 240, though the relative outside diameters of the first roller washer 230, second roller washer 240, first spacer washer 250, and second spacer washer 260 may vary in various embodiments. Further, the outside diameter of the first roller washer 230 may extend past the upper end 214 of the first lug 114 to prevent contact between the first lug 114 and the first roller 130, and the outside diameter of the second roller washer 240 may extend past the upper end 216 of the second lug 114 to prevent contact between the second lug 116 and the second roller 130, should the first roller 130 or the second roller 140 bend under a load. However, the outside diameters of the first roller washer 230 and the second roller washer 240 be smaller or larger in various embodiments.

Figure 12:
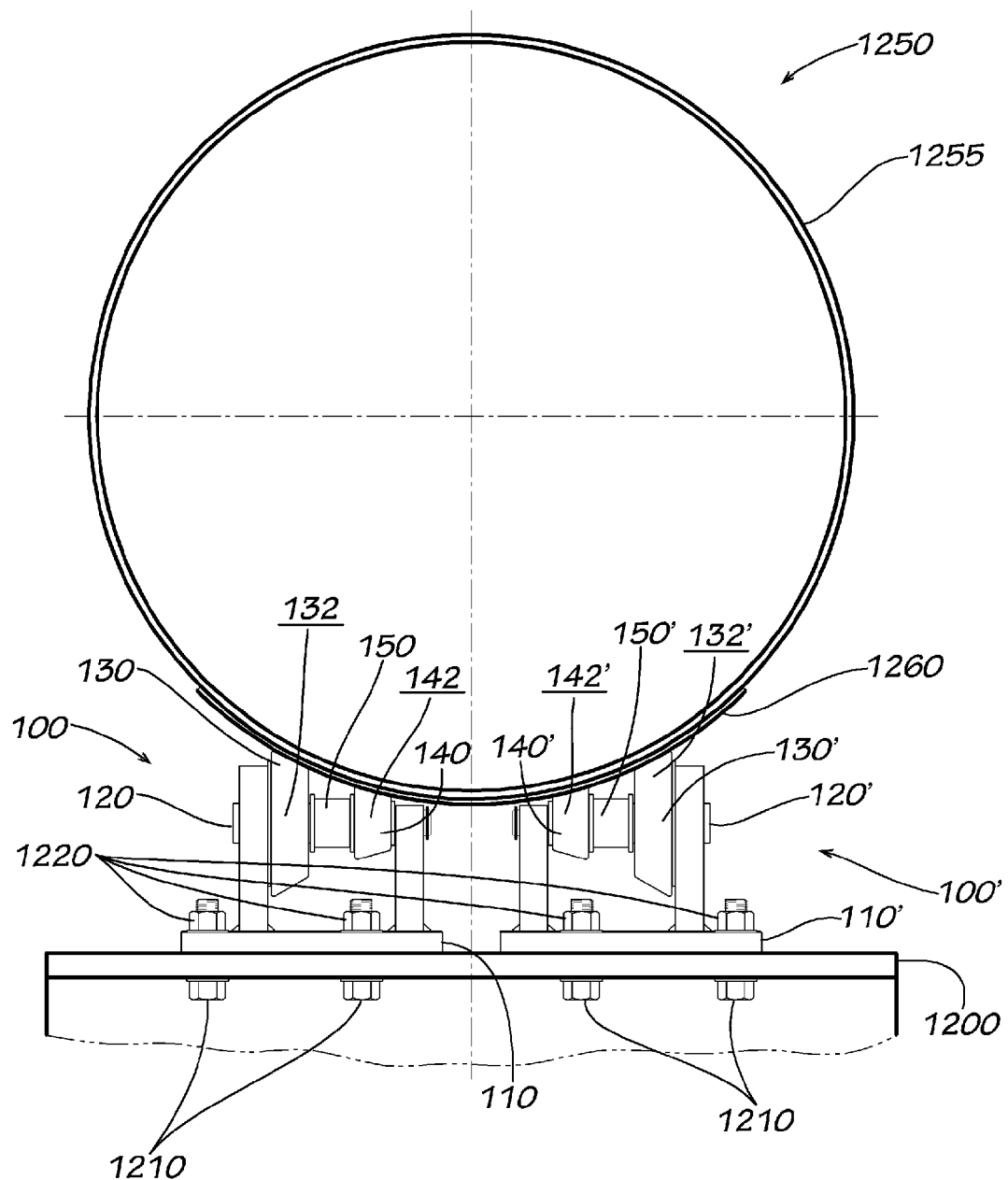
FIG. 12 is a side view of a pair of the pipe roller assemblies of FIG. 1 in use with a pipe.

FIG. 12 shows a pair of pipe roller assemblies 100,100' mounted on a mounting surface 1200. In the current embodiment, the pipe roller assembly 100' is identical to pipe roller assembly 100. The pipe roller assemblies 100,100' are fastened to the mounting surface 1200 by a plurality of bolts 1210 and nuts 1220 extending through the mounting surface 1200 and fastener holes 118. As seen in FIG. 12, a pipeline 1250 is mounted on the pipe roller assemblies 100,100'. In the current embodiment, the pipeline 1250 includes a wear plate 1260 between pipe roller assemblies 100,100' and pipe body 1255, though in various embodiments the pipe body 1255 may be in direct contact with the pipe roller assemblies 100,100'. The wear plate 1260 only contacts the outer roller surfaces 132,142 of the first roller 130 and the second roller 140, respectively, of the pipe roller assembly 100 and outer roller surfaces 132',142' of first roller 130' and second roller 140', respectively, of the pipe roller assembly 100', such that when current is applied to the pipeline 1250, the non-conductive barriers of the pipe roller assemblies 100,100' prevent current from being conducted to roller bases 110, 110' and to mounting surface 1200.

As seen in FIG. 12, the pipe roller assemblies 100,100' are spaced apart such that each of first rollers 130,130' and second rollers 140,140' contact the pipeline 1250, though the pipe roller assemblies 100,100' may abut each other in various embodiments to accommodate for various pipe sizes. In various embodiments, a single pipe roller assembly may be used rather than two pipe roller assemblies, for example by sizing the first roller and the second roller similarly and mounting them on the roller shaft so that the outer roller surfaces of the first roller and the second roller slope inwardly towards each other.

Further, as seen in FIG. 12, spacer bearings 150,150' prevent second rollers 140,140' from sliding away from pipeline 1250 along roller shafts 120,120'. In addition, spacer bearings 150,150' space apart first rollers 130,130' and second rollers 140,140', respectively, so that each of first rollers 130,130' and second rollers 140,140' contact the pipeline 1250. However, first rollers 130,130' and second rollers 140,140' may be spaced apart by various methods in various embodiments, such as including a rib on roller shafts 120,120' between first rollers 140,140' and second rollers 150,150', respectively.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe roller assembly comprising:
    a roller base;
    a lug, the lug defining a lug bore;
    a roller shaft mounted to the roller base on the lug through the lug bore, the roller shaft defining an outer shaft surface;
    a roller defining an outer roller surface and an inner bearing surface, the roller mounted on the roller shaft; and
    a non-conductive barrier mounted between the roller and the roller base, the non-conductive barrier electrically isolating the roller from the roller base thereby preventing any electric current from being conducted from the roller to the roller base, the non-conductive barrier comprising a bearing mounted between the roller and the roller shaft and a separation portion extending around the roller shaft and between the roller and the lug, the separation portion comprising a non-conductive material;
    wherein the bearing is a bushing, the bushing including an inner sliding layer and an outer backing layer, the inner sliding layer defining an inner bushing surface, the outer backing layer defining an outer bushing surface, the inner bushing surface contacting the outer shaft surface of the roller shaft, and the outer bushing surface contacting the inner bearing surface of the roller.

2. The pipe roller assembly of claim 1, wherein the inner sliding layer includes polytetrafluoroethylene, and wherein the outer backing layer includes fiberglass.

3. The pipe roller assembly of claim 1, wherein the bushing is press-fit to the inner bearing surface of the roller.

4. The pipe roller assembly of claim 1, wherein the separation portion of the non-conductive barrier is a washer mounted on the roller shaft between the roller and the lug.

5. The pipe roller assembly of claim 1, wherein the roller is a first roller, the pipe roller assembly further comprising a second roller defining an outer roller surface and an inner bearing surface, the second roller mounted on the roller shaft adjacent to the first roller, the non-conductive barrier electrically isolating the first roller and the second roller from the roller base.

6. The pipe roller assembly of claim 5, wherein the non-conductive barrier includes a first bushing and a second bushing, the first bushing mounted between the first roller and the roller shaft, and the second bushing mounted between the second roller and the roller shaft.

7. The pipe roller assembly of claim 5, wherein:
    the lug is a first lug;
    the lug bore is a first lug bore;
    the separation portion of the non-conductive barrier is a first roller washer;
    the roller base includes the first lug and a second lug, the second lug defining a second lug bore, the roller shaft mounted to the roller base on the first lug through the first lug bore, and on the second lug through a second lug bore, the first roller and the second roller mounted on the roller shaft between the first lug and the second lug; and
    the non-conductive barrier further comprising a second roller washer mounted on the roller shaft, the first roller washer mounted between the first lug and the first roller, and the second roller washer mounted between the second lug and the second roller.

8. The pipe roller assembly of claim 5, wherein the non-conductive barrier includes a spacer washer mounted on the roller shaft between the first roller and the second roller.

9. The pipe roller assembly of claim 8, further comprising a spacer bearing mounted on the roller shaft between the first roller and the second roller, wherein the spacer washer is a first spacer washer, and wherein the non-conductive barrier includes a second spacer washer mounted on the roller shaft, the first spacer washer mounted between the first roller and the spacer bearing, the second spacer washer mounted between the second roller and the spacer bearing.

10. A pipe roller assembly comprising:
a roller base;
a roller shaft mounted to the roller base, the roller shaft defining an outer shaft surface;
a first roller and a second roller, the first roller and the second roller each defining an outer roller surface and an inner bearing surface, each of the first roller and the second roller mounted on the roller shaft;
a spacer bearing mounted on the roller shaft between the first roller and the second roller, the spacer bearing formed from a non-conductive material; and
a non-conductive bearing mounted on the roller shaft, the bearing electrically isolating the first roller from the roller base thereby preventing any electric current from being conducted from the first roller to the roller base, the bearing having an axial length equal to an axial length of the first roller.

11. The pipe roller assembly of claim 10, further comprising a non-conductive roller washer mounted on the roller shaft between the roller base and the first roller.

12. The pipe roller assembly of claim 10, wherein the bearing is a bushing.

13. The pipe roller assembly of claim 12, wherein the bushing includes an inner sliding layer and an outer backing layer, the inner sliding layer defining an inner bushing surface, the outer backing layer defining an outer bushing surface, the inner bushing surface contacting the roller shaft, the outer bushing surface contacting the inner bearing surface of the first roller.

14. The pipe roller assembly of claim 12, wherein the bushing is press-fit to the inner bearing surface of the first roller.

15. The pipe roller assembly of claim 10, wherein:
the roller base includes a first lug and a second lug, the first lug defining a first lug bore, the second lug defining a second lug bore;
the roller shaft is mounted on the first lug through the first lug bore and on the second lug through the second lug bore; and
the first roller is mounted between the first lug and the second lug;
the pipe roller assembly further comprising a first non-conductive roller washer between the first lug and the first roller and a second non-conductive roller washer between the second lug and the first roller.

16. The pipe roller assembly of claim 10, further comprising a first spacer washer and a second spacer washer, the first spacer washer mounted between the first roller and the spacer bearing, the second spacer washer mounted between the second roller and the spacer bearing.

17. A pipe roller assembly comprising:
a roller base;
a lug, the lug defining a lug bore;
a roller shaft mounted to the roller base on the lug through the lug bore, the roller shaft defining an outer shaft surface;
a first roller and a second roller, the first roller and the second roller each defining an outer roller surface and an inner bearing surface, the first roller mounted on the roller shaft, the second roller mounted on the roller shaft adjacent to the first roller;
a spacer bearing mounted on the roller shaft between the first roller and the second roller; and
a non-conductive barrier mounted between the roller and the roller base, the non-conductive barrier electrically isolating the first roller and the second roller from the roller base thereby preventing any electric current from being conducted from the roller to the roller base, the non-conductive barrier comprising
a separation portion extending around the roller shaft and between the first roller and the lug, the separation portion comprising a non-conductive material,
a first spacer washer mounted on the roller shaft between the first roller and the spacer bearing, and
a second spacer washer mounted on the roller shaft between the second roller and the spacer bearing.

18. The pipe roller assembly of claim 17, wherein the non-conductive barrier includes a first bushing and a second bushing, the first bushing mounted between the first roller and the roller shaft, and the second bushing mounted between the second roller and the roller shaft.

19. A pipe roller assembly comprising:
a roller base;
a roller shaft mounted to the roller base, the roller shaft defining an outer shaft surface;
a roller defining an outer roller surface and an inner bearing surface, the roller mounted on the roller shaft; and
a non-conductive bushing mounted on the roller shaft, the non-conductive bushing electrically isolating the roller from the roller base thereby preventing any electric current from being conducted from the roller to the roller base, the non-conductive bushing having an axial length equal to an axial length of the roller, the non-conductive bushing including an inner sliding layer and an outer backing layer, the inner sliding layer defining an inner bushing surface, the outer backing layer defining an outer bushing surface, the inner bushing surface contacting the roller shaft, the outer bushing surface contacting the inner bearing surface of the roller.

20. The pipe roller assembly of claim 19, wherein the non-conductive bushing is press-fit to the inner bearing surface of the roller.

* * * * *